Nov. 8, 1938.　　　W. M. BAUMHECKEL　　　2,136,095
PULL LEVER
Original Filed April 23, 1935　　2 Sheets-Sheet 1
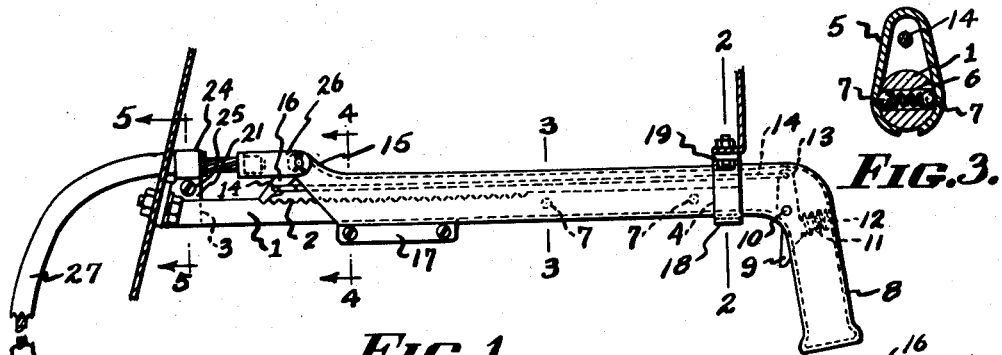
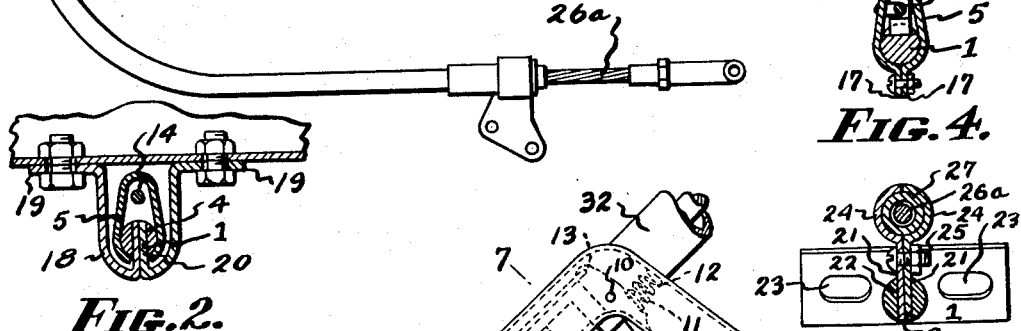
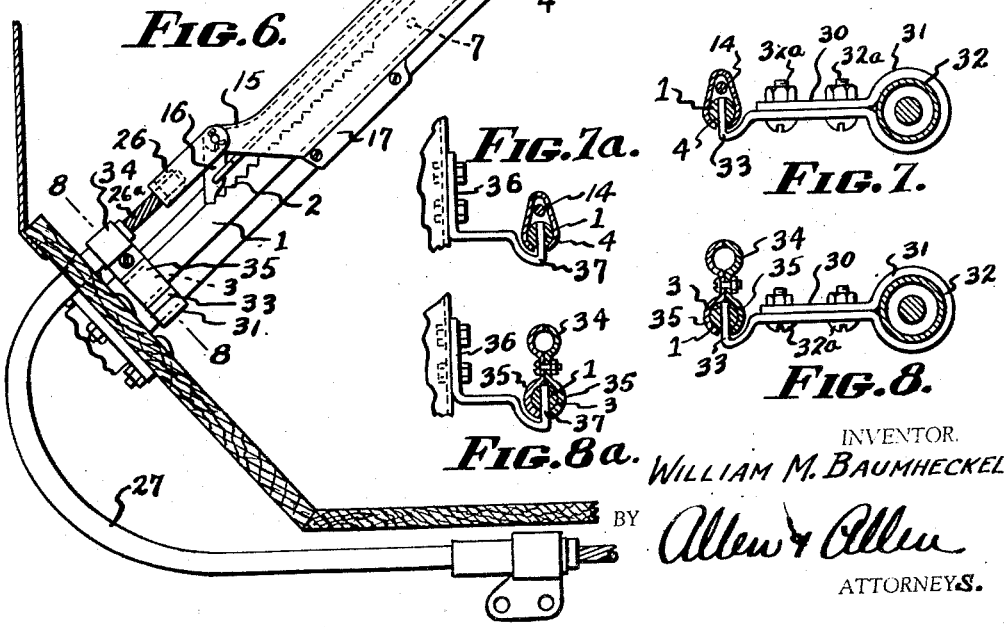
INVENTOR.
WILLIAM M. BAUMHECKEL
BY Allen & Allen
ATTORNEYS.

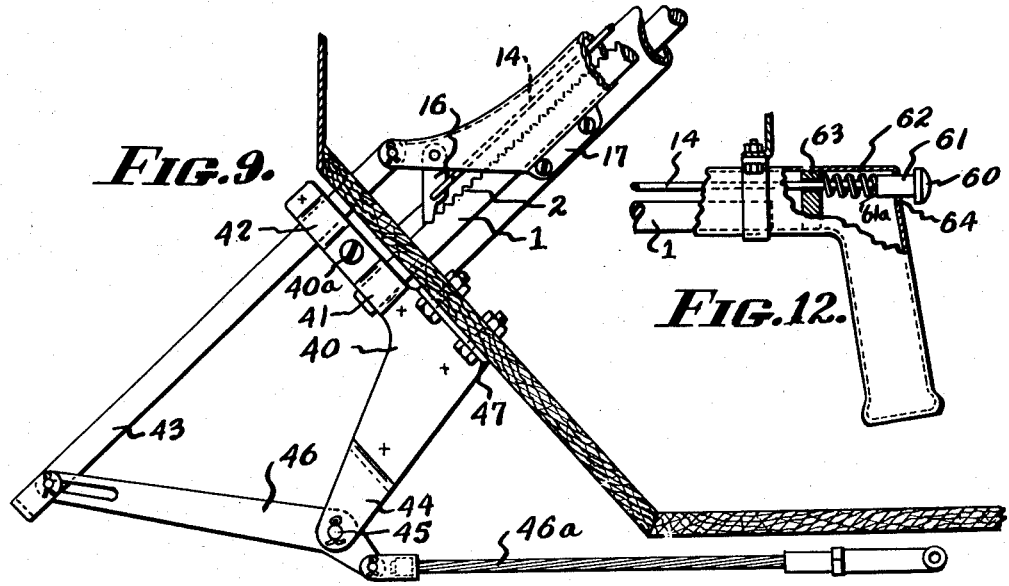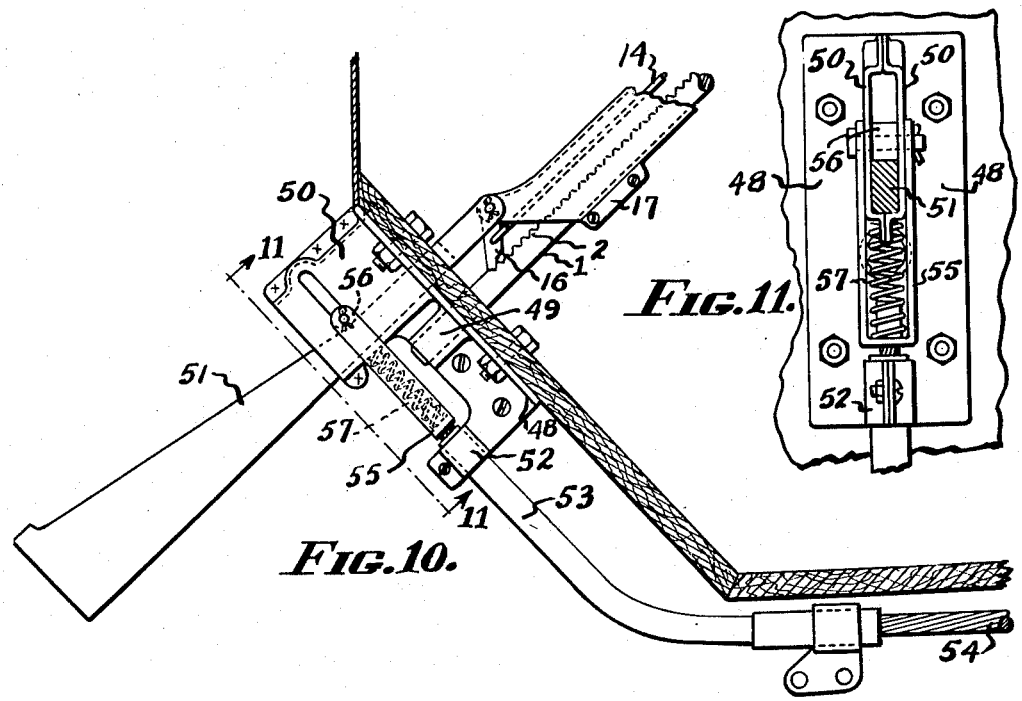

Patented Nov. 8, 1938

2,136,095

UNITED STATES PATENT OFFICE 2,136,095

PULL LEVER

William M. Baumheckel, Cincinnati, Ohio

Application April 23, 1935, Serial No. 17,818
Renewed April 7, 1938

12 Claims. (Cl. 74—502)

My invention relates to what are known as levers of the pull type, ordinarily employed for the emergency brakes in motor cars for example, although strictly speaking they are pull rods. In the more modern types of automobiles it is desired to avoid placing the brake lever at the right of the driver in the floor of the car, which has been the principal practice in recent years because of facility of mounting the lever on the transmission case of the motor. To mount the brake lever on the left side of the driver under the cowl in order to get it out of the way of the doors is not very satisfactory and often calls for a long reach that is not suitable for many drivers.

It is one of the objects of my invention to supply a brake applying member of the pull type, which can be supported on the dash and instrument panel or supported on the steering column or a body pillar of the motor car, thus making it adaptable for a wide variety of locations.

Another of my objects is to provide a different type of pawl release for the brake applying member, which accommodates itself better to easy operation than the push button type of release of present day familiar use.

Another object of my invention is to provide a novel structure for a pull lever brake applying member which is inexpensive but strong, easy to operate, and which will not mar in use because of its mounting.

Another object is to provide a pull lever device for the purpose noted which is attractive in appearance with no exposed operating parts except an outer sleeve.

I accomplish these objects and other advantages which will be set forth, by that construction and arrangement of parts of which several examples will be described, and shown in the attached drawings. Reference is made to the appended claims for a statement of the novelty inherent in structures made according to my invention of which the described embodiments are exemplary.

In the drawings—

Figure 1 is a side elevation of my novel pull lever device, shown as attached to portions of a dash and instrument panel.

Figure 2 is a section of the device on line 2—2 of Figure 1.

Figure 3 is a section of the device on the line 3—3 of Figure 1.

Figure 4 is a section on the line 4—4 of Figure 1.

Figure 5 is a section on the line 5—5 of Figure 1.

Figure 6 is a side elevation of one of my novel devices, shown as mounted on the steering column of an automobile.

Figure 7 is a section on the line 7—7 thereof.

Figure 8 is a section on the line 8—8 thereof.

Fig. 7a is a section corresponding to Fig. 7 but showing a mounting on a body pillar of the car.

Fig. 8a is a section corresponding to Fig. 8 showing a mounting on the body pillar also.

Fig. 9 is a side elevation showing a lever reduction member for use with my novel devices.

Fig. 10 is a side elevation showing a wedge type reduction member for use with my novel devices.

Fig. 11 is a section taken along the line 11—11 of Fig. 10.

Fig. 12 is a fragmentary view of a lever showing how a push button may be used to release the pawl.

The preferred form of my device as illustrated is formed of a round rack bar 1, provided with rack teeth 2 along a portion of its upper face. This bar is preferably milled with grooves 3, and 4 in its ends for mounting purposes. Fundamentally this bar need not be round and some other mounting may be provided.

The sliding portion or pull members of the device is formed of cold rolled steel, bent in dies to a tapering oval in shape, left open at the bottom with the taper above, as shown at 5. The lower portion of this member is shaped through the main part of its length to fit snugly around the rack bar 1, so as to slide thereon. The upper portion is shaped to house the pawl rod, as will be described. Thus the cross section shape of the pull member will be dictated by the two elements which it must fit.

As illustrated in Fig. 3, I will preferably provide at one or more points throughout the rack bar 1, a hole in which is set a spring 6, which spring bears on balls 7, 7, set into the hole and which will bear on the inside of the sliding tube. This provides for a snug mounting of the pull member and a reduction of frictional resistance.

At the operating end, the tube is bent into a pistol type grip 8, which is left open at the inner side by preference, in order to facilitate the mounting of the trigger. This trigger shown at 9, is pivoted on a pin 10 set across the tubular member, and has a post 11 thereon, which carries a spring 12 thereon, so as to move the trigger to the position shown in Fig. 1, when same is released.

To the upper end 13 of the trigger a rod 14 is pivotally connected, which rod passes through the upper or tapered portion of the tubular member to its forward end.

The tubular member is formed at its forward end with an upwardly projecting portion 15, which is used for connecting to the brake operating mechanism. At this point a pawl 16 is pivoted which engages with the rack formed on the fixed bar of the device. The rod 14 is pivotally connected to this pawl.

As a result of the structure so far described, the tubular member may be slid along on the supporting bar, with the pawl riding on the rack and holding the tube wherever it is released. However, by gripping the device by the piston grip and using the fingers to pull the trigger, which will be a natural action and not difficult in any way, the pawl will be raised and rocked forward, thus permitting the tubular member to be moved independently of the rack.

In order to strengthen the tube element, it is provided with lips 17 at that portion near its inner end, and these lips are brought together in forming the tube, and screwed tightly to each other, so as to close the tube at this point.

In mounting the device in place, it is the fixed bar or rack bar which is supported. To this end brackets may be provided of various types, which are preferably welded to the fixed bar, and do not interfere with mounting the pull member thereon.

Thus in the form shown in Figs. 1 to 5, where the device is mounted on the dash and instrument panel, I provide the following arrangement. At the instrument panel a bracket is formed of two metal pieces forming a U shaped hanger 18, and ears 19, 19, which are bolted to the bottom flange of the instrument panel. At the base of the U the pieces are placed together in an upstanding tongue 20. This tongue is thrust into the groove 4 in the end of the rack bar, and spot welded.

The forward end of the rack bar is provided with a mounting consisting of two metal plates 21, 21, having portions 22 which are set together and in turn thrust into the slot 3 in the end of the rack bar, where they are welded to it. The two plates have holes 23 therein for bolting to the dash of the car, and also have upstanding portions 24, 24, which are formed into a half round shape to grip over the pull cable casing of the device, this grip being controlled by a bolt 25, as shown.

To the end of the slidable member or tubular member is secured a cable connecter 26, for the cable 26a which passes through the cable casing 27, whence it is connected to the brake reduction transmission, of whatever type desired.

The arrangement is such that the rack bar or fixed bar element of the device is mounted and welded to the supporting brackets, after which the tubular member can be slid into place by threading it through the rearward bracket. This bracket is such that it does not touch the sliding member and hence does not mar the exterior.

For mounting the device on the steering column I provide devices such as illustrated in Figs. 7 and 8. Metal stampings 30 are used, having clamping ring portions 31 for engaging over the column 32, which rings are held in gripping relation by means of bolts 32a. The stamping projects beyond the clamp element thereof and is turned up in a tongue 33, which is thrust into the milled groove in one end of the rack bar and welded there.

The rack bar is thus provided with a pair of incorporated brackets which are slid over the steering column and clamped into place. A clip 34, formed with two clamping portions 35, may be engaged over the forward end of the rack bar for supporting the pull cable casing.

For mounting on a body pillar, the brackets will be of single stampings having mounting plates 36 and projecting tongues 37, which are welded in the ends of the rack bar as before.

Common to all of the mountings is the feature of permanent connection with the rack bar, although this is only preferred. It is a very desirable feature of the mounting brackets that they support the rack bar without engaging the sliding member of the device. Because of this the support for the pull member is from within, which prevents marring of the pull member, as would be the case in an external journal.

I have shown several ways of providing for a lever reduction for use with my pull type lever. In the familiar hand lever the reduction is provided by the lever itself and no additional transmission is required.

One form which I show (Fig. 9) consists of a bracket 40 secured beneath the forward floor board. This bracket is formed of two pieces of metal welded together and spread at 41 to house the forward end of the rack bar, welding being preferred as a means of securing the bar, although clamping may be satisfactory. The metal pieces are also spread at 42 to engage the lever member 43, which is secured to the end of the pull member. A bolt 40a passing through the two plates provides for holding the two metal pieces together between the portions 41 and 42, where they are not welded. They are welded at the lips beyond the portion 42.

The lower projection of the bracket is also formed by spreading the two metal pieces as at 44, to provide a mounting for a pivot pin 45. A bell crank lever 46 is pivoted by the pin 45, and its short arm connected to the pull cable 46a of the brake system. The long end of the lever is pivotally connected with a slotted mounting in the end of the lever element 43. The bracket noted has mounting ears 47 for securing it to the floor board.

Another mode of providing for transmission reduction is by the use of a bracket again formed of two united pieces of metal which have mounting ears 48, spread portion 49 for housing the end of the rack bar and preferably welded thereto, and spread portions 50, which form a wedge box for the wedge 51, that slides therein. The spread portion 52 of the bracket retains the cable casing 53, through which passes the cable 54 for the brake system. The cable is secured to a cable connector 55, which is in the form of a fork that straddles the wedge housing. A roller 56 mounted in the end of the fork and lying within the wedge housing bears against the top of the wedge, and a compression spring 57 mounted within the fork holds the fork down so as to maintain the wedge snugly against the base of its housing, thus preventing rattling. The spring system, as applied to the brakes themselves, also serves to maintain this snug arrangement. As the wedge is moved in or out the roller follows it, and thus a wedge type reduction is provided for applying the brakes.

In the two forms shown, the upper ends of the rack bar may be secured to the steering column or to a body pillar.

As seen in Fig. 12, the pawl release may be of the push button type. Here a push button 60, having shank 61 is attached to the outer end of the pawl release rod 14. Compression spring 62 is confined between the end 61a of the push button and a plug 63, said spring holding the pawl 16 in engagement with the rack and preventing rattling of the parts. The plug 63 has a hole which provides a bearing for rod 14, and the lever handle has a hole 64 to receive shank 61 of the push button.

It will be evident that other forms of reduction mechanism could be provided, and other modes of mounting the devices now described, without departing from the novelty inherent in the forms shown, which will be expressed in the following claims.

What I claim as new and desire to secure by Letters Patent is:

1. A pull device, comprising a bar, a sliding member supported solely by the bar, connections from the sliding member to a mechanism to be acted upon, at one end, and a grip on the other end for manipulation, rack teeth formed on the bar, and a pawl engaging the same and mounted in the sliding member, and means on the grip, and operable upon grasping the same, to release the pawl.

2. A pull device, comprising a bar, a sliding member supported solely by the bar, connections from the sliding member to a mechanism to be acted upon at one end, and a grip on the other end for manipulation, said grip being of the pistol grip type, rack teeth formed on the bar and a pawl for engaging the same mounted in the sliding member, and a trigger mounted in the said grip, and operable upon grasping the same, and connected to said pawl, for releasing it.

3. A pull device comprising a rack bar, a sliding member having a pawl therein to engage the rack bar, said sliding member being tubular in cross section and mounted to slide on the rack bar and supported thereby, means for supporting the rack bar at its ends, so arranged as to be out of contact with the sliding member, a pistol type grip on the one end of the sliding member for purposes of manipulation, and a trigger operative upon grasping of said grip to release said pawl.

4. A pull device comprising a rack bar, a sliding member having a pawl therein to engage the rack bar, said sliding member being tubular in cross section and mounted to slide on the rack bar and supported thereby, means for supporting the rack bar at its ends, so arranged as to be out of contact with the sliding member and a pistol type grip on the one end of the sliding member for purposes of manipulation, and a trigger mounted at the side of said pistol grip away from the operator, connected to the said pawl through the sliding member, and operative to release said pawl upon grasping of said grip.

5. A pull device comprising a rack bar, a sliding member having a pawl therein to engage the rack bar, said sliding member being tubular in cross section and mounted to slide on the rack bar and supported thereby, and means for supporting the rack bar at its ends, so arranged as to be out of contact with the sliding member, said rack bar having spring balls supported therein to snugly engage the sliding member.

6. A pull device comprising a rack bar, a sliding member having a pawl therein to engage the rack bar, said sliding member being tubular in cross section and mounted to slide on the rack bar, and means for supporting the rack bar at its ends, so arranged as to be out of contact with the sliding member, said supporting means having tongues located in grooves in the end of the rack bar, and mounting means projecting away from the rack bar so as to clear the sliding member.

7. A pull device comprising a rack bar, a sliding member having a pawl therein to engage the rack bar, said sliding member being tubular in cross section and mounted to slide on the rack bar and supported thereby, and means for supporting the rack bar at its ends, so arranged as to be out of contact with the sliding member, said tubular member being left unclosed through the main portion of its length, but having lips thereon which are retained together so as to close the same, at that portion thereof adjacent the pawl mounting.

8. A pull device comprising a rack bar, a sliding member having a pawl therein to engage the rack bar, said sliding member being tubular in cross section and mounted to slide on the rack bar and supported thereby, means for supporting the rack bar at its ends, so arranged as to be out of contact with the sliding member, said tubular member being left unclosed through the main portion of its length, but having lips thereon which are retained together so as to close the same, at that portion thereof adjacent the pawl mounting, a pistol type grip on the one end of the sliding member for purposes of manipulation and a trigger mounted at the side of said pistol grip away from the operator, connected to the said pawl through the sliding member, and operative to release said pawl upon grasping of said grip.

9. In an automobile brake system, a bracket for mounting on the dash of the automobile, and bracket for mounting on the instrument board thereof, a rack bar fixedly secured to said brackets, and a tubular member slidably mounted over the rack bar, and having a pawl for engaging the same, and a connection with the brake system at one end, and a grip at the other.

10. In an automobile brake system, a bracket for mounting on the dash of the automobile, and bracket for mounting on the instrument board thereof, a rack bar fixedly secured to said brackets, and a tubular member slidably mounted over the rack bar, and having a pawl for engaging the same, and a connection with the brake system at one end, and a grip at the other, said grip being of the pistol type.

11. A pull device comprising a rack bar, a sliding member having a pawl therein to engage the rack bar, said sliding member being tubular in cross section and mounted to slide on the rack bar and supported thereby, means for supporting the rack bar at its ends, so arranged as to be out of contact with the sliding member, a pistol type grip on the one end of the sliding member for purposes of manipulation, and a trigger operative upon grasping of said grip to release said pawl, the entire sliding member being formed from one piece of metal.

12. A pull device comprising a rack bar, a sliding member having a pawl therein to engage the rack bar, said sliding member being tubular in cross section and mounted to slide on the rack bar and supported thereby, means for supporting the rack bar at its ends, so arranged as to be out of contact with the sliding member, a pistol type grip on the one end of the sliding member for purposes of manipulation, and a trigger operative upon grasping of said grip to release said pawl, the entire sliding member being formed from one piece of metal, and a motion reduction mechanism forming part of the said connection with the brake system.

WILLIAM M. BAUMHECKEL.